US007454112B2

(12) United States Patent
Chen et al.

(10) Patent No.: US 7,454,112 B2
(45) Date of Patent: Nov. 18, 2008

(54) RIDGE AND MESA OPTICAL WAVEGUIDES

(75) Inventors: Young-Kai Chen, Berkeley Heights, NJ (US); Andreas Bertold Leven, Gillette, NJ (US); Yang Yang, Gillette, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 11/394,780

(22) Filed: Mar. 31, 2006

(65) Prior Publication Data

US 2007/0230886 A1    Oct. 4, 2007

(51) Int. Cl.
*G02B 6/10* (2006.01)
*G02B 6/00* (2006.01)
(52) U.S. Cl. .................. 385/131; 385/129; 385/130; 385/141; 385/142
(58) Field of Classification Search ............... 385/131
See application file for complete search history.

(56) References Cited

U.S. PATENT DOCUMENTS

| 6,487,354 | B1 * | 11/2002 | Ferm et al. ............... 385/129 |
| 2005/0068887 | A1 | 3/2005 | Chen et al. ............... 370/215 |
| 2005/0135765 | A1 * | 6/2005 | Nakata et al. ............ 385/129 |

* cited by examiner

*Primary Examiner*—Frank G Font
*Assistant Examiner*—Ryan Lepisto

(57) ABSTRACT

Apparatus including: a substrate layer having a substantially planar top surface; an optically conductive peak located and elongated on, and spanning a first thickness measured in a direction generally away from, the top surface; the optically conductive peak having first and second lateral walls each including distal and proximal lateral wall portions, the proximal lateral wall portions intersecting the top surface; and first and second sidewall layers located on the distal lateral wall portions, the sidewall layers not intersecting the top surface and spanning a second thickness that is less than the first thickness measured in the same direction.

19 Claims, 10 Drawing Sheets

RIDGE AND MESA OPTICAL WAVEGUIDES

GOVERNMENT RIGHTS

The U.S. Government has a paid-up license in this invention and the right in limited circumstances to require the patent owner to license others on reasonable terms as provided for by the terms of U.S. Defense Advanced Research Projects Agency ("DARPA") TFAST contract No.: MDA972-02-C-0046.

BACKGROUND OF THE INVENTION

1. Field of the Invention

The invention relates to ridge and mesa optical waveguides, and methods of making ridge and mesa optical waveguides.

2. Related Art

This section is intended to present to the reader various introductory concepts that may be related to various aspects of the present invention. As such, it is believed that this section may be helpful in providing the reader with information to facilitate a better understanding of the various aspects of the present invention. The statements of this section are to be read in this light and are not to be understood as admissions of prior art.

Ridge and mesa optical waveguides are well-known classes of multi-layer structures that are useful for guiding light along a selected pathway. Ridge and mesa optical waveguides can also be, as an example, optically integrated with active and passive electronic devices such as phase modulators and optical switches, configured for controlling and otherwise affecting the path and nature of light propagating through such optical waveguides. Optical waveguides, including ridge and mesa optical waveguides, typically include a core region surrounded by a cladding region. The core region has a higher refractive index than does the cladding region. The resulting refractive index gradient serves to confine a portion of the light to propagation through the core region. The ridge in a ridge optical waveguide additionally serves to optically channel light propagating at the top surface of a substrate located adjacent to the ridge, along a path defined by the lateral position of the ridge on the substrate. In an example, the ridge in a ridge optical waveguide may include portions of the core and cladding regions of the optical waveguide. The ridge may cause light to propagate in the substrate along the path of the ridge on the substrate. The ridge in a ridge optical waveguide may as an example define a path for a portion of an optical circuit. At the same time, wider lateral dimensions of the substrate relative to lateral dimensions of the ridge permits transmission of a greater optical bandwidth, through the substrate along a path in the same direction taken by light propagating through the ridge itself. In a mesa optical waveguide, the entire core and cladding regions may define a substantially integrated optical path.

There is a continuing need for new types of ridge and mesa optical waveguides, and for methods of making such ridge and mesa optical waveguides.

SUMMARY

In one example of an implementation, an apparatus is provided, including: a substrate layer having a substantially planar top surface; an optically conductive peak located on, and elongated on, and spanning a first thickness measured in a direction generally away from, the top surface; the optically conductive peak having first and second lateral walls each including distal and proximal lateral wall portions, the proximal lateral wall portions intersecting the top surface; and first and second sidewall layers located on the distal lateral wall portions, the sidewall layers not intersecting the top surface and spanning a second thickness that is less than the first thickness measured in the same direction.

In another example, a method of fabricating a peak optical waveguide is provided, including: forming an optically conductive layer on a substantially planar top surface of a substrate; selectively dry etching the optically conductive layer to form first and second distal lateral wall portions of first and second lateral walls of the optically conductive layer located and elongated on the top surface; forming first and second sidewall layers located on the distal lateral wall portions; and selectively wet etching the optically conductive layer to form a peak on the top surface, including first and second proximal lateral wall portions of the first and second lateral walls of the optically conductive layer that intersect the top surface; in which the sidewall layers do not intersect the top surface, and span a first thickness measured in a direction generally away from the top surface that is less than a second thickness spanned by the optically conductive peak measured in the same direction.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

The invention may be better understood with reference to the following figures. The components in the figures are not necessarily to scale nor relative dimensions, emphasis instead

DETAILED DESCRIPTION

Ridge and mesa optical waveguides include multilayer structures in which at least some portions of an optical core region and an optical cladding region are elevated on a substrate. Ridge and mesa optical waveguides are collectively referred to as "peak optical waveguides" throughout this specification. Lateral surfaces of the optical core or cladding regions or both in peak optical waveguides may be exposed to an external material or an external environment, such as airspace. Smooth boundaries for the core and cladding regions of a peak optical waveguide where they meet airspace can reduce losses of light from within the peak optical waveguide that might otherwise occur. Rough boundaries, conversely, can cause significant attenuation of a light signal being transmitted through a peak optical waveguide. Fabrication of a peak optical waveguide may include shaping of various layers of materials in order to produce a peak having a selected pathway on a substrate integrated with the peak. Shaping of such various layers may generate rough boundaries between the cladding region and airspace or other materials, or between the core region with airspace or other materials. These rough boundaries can cause significant losses of light intended to be propagated on a pathway generally defined by the lateral position of the peak on the substrate. These losses of light can result in a corresponding reduction in the strength of an optical signal or reduction in the intensity of a propagating optical beam. In an implementation of an example, peak optical waveguides, including ridge and mesa optical waveguides, are now provided having structures that may lead to reduced losses of light caused by rough boundaries between core and cladding regions with airspace or other materials.

Figure 1:
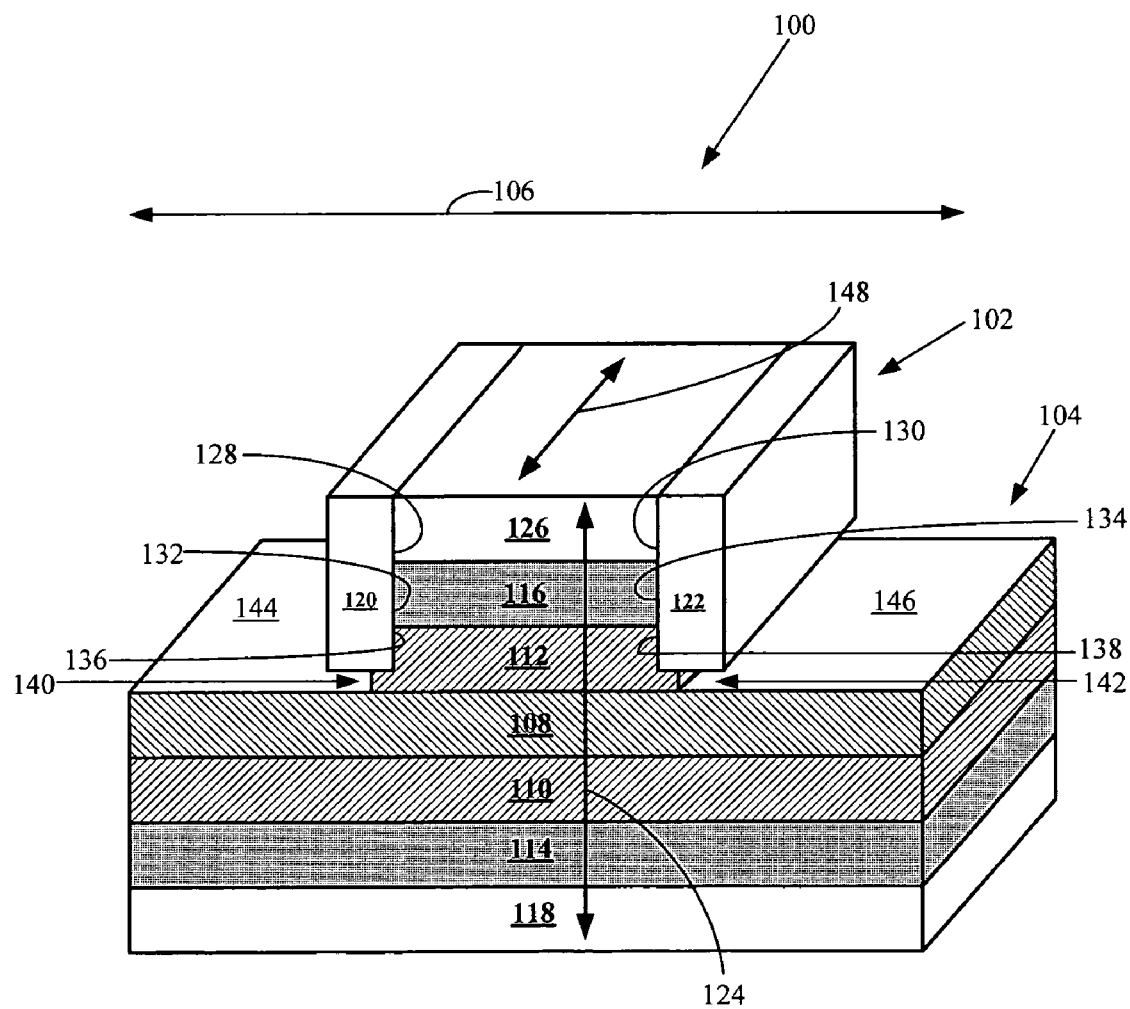
FIG. 1 is a cross-sectional perspective side view showing an example of an implementation of a ridge optical waveguide.

FIG. 1 is a cross-sectional perspective side view showing an example of an implementation of a ridge optical waveguide 100. The ridge optical waveguide 100 includes an optically conductive ridge region 102 and a substantially planar substrate region 104. A lateral width of the substantially planar substrate region 104 in the directions of the arrow 106 may be greater than a lateral width of the optically conductive ridge region 102 in the same directions. The substantially planar substrate region 104 may have an optically conductive layer 108 including a first semiconductor composition, located on an optically conductive layer 110 including a second semiconductor composition. The optically conductive ridge region 102 may have an optically conductive layer 112 also including the second semiconductor composition, located on the optically conductive layer 108. The refractive indices of the first and second semiconductor compositions may be substantially equal, while their semiconductor compositions are different. Accordingly, the two optically conductive layers 110 and 112 including the second semiconductor composition, together with the interposed optically conductive layer 108 including the first semiconductor composition, may collectively define a core region for the ridge optical waveguide 100 as indicated by hatching. The substantially planar substrate region 104 may further have an optically conductive layer 114 including a third semiconductor composition, on which the optically conductive layer 110 may be located. The optically conductive ridge region 102 may further have an optically conductive layer 116 including the third semiconductor composition, under which the optically conductive layer 112 may be located. The refractive index of the third semiconductor composition may be lower than the refractive indices of the first and second semiconductor compositions. Accordingly, the two optically conductive layers 114 and 116 may together define a cladding region for the ridge optical waveguide 100 as indicated by shading. As another example, the optically conductive layers 110 and 112 may each include different semiconductor compositions, provided that each of such semiconductor compositions has a refractive index substantially equal to that of the first semiconductor composition. As a further example, the optically conductive layers 114 and 116 may each include different semiconductor compositions, provided that each of such semiconductor compositions has a refractive index that is sufficiently lower than that of the first semiconductor composition so as to function as an optical cladding. In another example, the optically conductive layer 114 may be physically supported on a substrate layer 118.

The optically conductive ridge region 102 further includes sidewall layers 120 and 122 each having a height in the directions of the arrow 124 that is less than the combined thickness in the same directions of optically conductive layers 112 and 116, and a protective layer 126 on the optically conductive layer 116. As an example, an aspect ratio of the combined average thickness in the directions of the arrow 124 of the optically conductive layers 112 and 116 and the protective layer 126 if present, divided by an average width in the directions of the arrow 106 of each of the sidewall layers 120 and 122, is greater than 1:1. The protective layer 126 may protect the optically conductive layer 116 against erosion by wet etching or other wet processing during fabrication of the ridge optical waveguide 100. The protective layer 126 may protect the optically conductive layer 116 against erosion by dry or wet etching or other dry or wet processing during fabrication of the ridge optical waveguide 100.

The sidewall layers 120 and 122 may, as an example, adjoin lateral walls 128 and 130 of the protective layer 126, and lateral walls 132 and 134 of the optically conductive layer 116. In another example, the sidewall layers 120 and 122 may adjoin distal lateral wall portions 136 and 138 of the optically conductive layer 112. In an additional example, proximal lateral wall portions 140 and 142 of the optically conductive layer 112 may remain exposed adjacently to and in spite of the presence of the sidewall layers 120 and 122. The distal lateral wall portions 136 and 138 are farther away from the optically conductive layer 108 than are the proximal lateral wall portions 140 and 142. However, thicknesses of the proximal lateral wall portions 140 and 142 in the directions of the arrow 124 may constitute as little as about 10% of the thickness of the optically conductive layer 112 in the same directions. The sidewall layers 120 and 122 may, as an example, protect the lateral walls 132 and 134 of the optically conductive layer 116 and the distal lateral wall portions 136 and 138 of the optically conductive layer 112 against erosion by a wet etchant or other wet processing that may be employed to remove portions of a blank (shown in FIG. 4 discussed below) for the optically conductive layer 112 in order to leave behind substantially planar top surfaces 144 and 146 on the optically conductive layer 108, during fabrication of the ridge optical waveguide 100 as further discussed below. The lateral walls 132 and 134 of the optically conductive layer 116 and the distal lateral wall portions 136 and 138 of the optically conductive layer 112 may have surfaces that are smoother and less rough than they might have been had such portions of the optically conductive layers 116 and 112 been exposed to a wet etchant during formation of the top surfaces 144 and 146 in the absence of the sidewall layers 120 and 122. In an example, up to about 90% of a thickness of the optically conductive layer 112 in the direction of the arrow 124 may be so protected by the sidewall layers 120 and 122 against erosion by a wet etchant or other wet processing during fabrication of the ridge optical waveguide 100. As another example, the optically conductive ridge region 102 may be covered with a dielectric layer (not shown) formed of inorganic or organic materials or of both inorganic and organic materials.

It is understood that the substrate layer 118 may be omitted. It is additionally understood that protection of the optically conductive layer 116 from a wet etching process may likewise be otherwise achieved and that the protective layer 126 may be omitted. It is further understood that the optically conductive layer 110 may be omitted. It is additionally understood that the optically conductive layers 108 and 112 may be combined.

The chemical compositions for forming the optically conductive layers 108, 110 and 112 are selected to have refractive indices sufficiently greater than refractive indices of semiconductor compositions selected for forming the optically conductive layers 114 and 116 so that the optically conductive layers 108, 110 and 112 can function as an optical waveguide core and so that the optically conductive layers 114 and 116 can function as an optical waveguide cladding. As earlier noted, the semiconductor compositions of the optically conductive layers 110 and 112 may as an example be different from each other, provided that their refractive indices are substantially equal to each other and to that of the optically conductive layer 108. As also earlier noted, the semiconductor compositions of the optically conductive layers 114 and 116 may as an example be different from each other, provided that their refractive indices are substantially equal to each other and suitable for forming an optical waveguide cladding for the optically conductive layers 110, 108 and 112.

The term "layer" as used throughout this specification refers to a solid thickness of a composition. A layer may be monolithic or multi-laminar. For example, a layer may have multiple sub-layers. In an example, a "layer" may have a substantially uniform thickness and substantially planar, mutually parallel surfaces. A "layer" may also have a non-uniform thickness and other non-uniform dimensions, and does not have to be completely continuous. A "layer" may include one or more layers of the same material or different materials, which may or may not interpenetrate each other, and which layers together are referred to as the "layer". There is no particular limitation on the thickness or other dimensions of a layer, although layers may have dimensions that are optimized for their intended function. The term "laminate" as used throughout this specification refers to two or more layers that are bonded together.

Chemical compositions for forming the optically conductive layers 108, 110, 112, 114 and 116 may be, as examples, inorganic semiconductor compositions including elements of Groups III and V of the periodic table of the elements, such semiconductor compositions being those that are known to be useful for forming core and cladding regions of optical waveguides. In an example, a semiconductor composition for forming the optically conductive layer 112 is selected that may be readily etched by a wet etching composition; and a semiconductor composition for forming the optically conductive layer 108 is selected that may be resistant to etching by the wet etching composition. The optically conductive layer 108 may then function as a barrier to a wet etching process as further discussed below in connection with FIGS. 3-5. As a further example, semiconductor compositions for forming the optically conductive layers 116 and 112 may be selected that may be readily etched by a dry etching process as further discussed below in connection with FIGS. 3-5. As another example, semiconductor compositions for forming the optically conductive layers 108, 110, 112, 114 and 116 may be compositions including elements of Groups III and V, or elements of Groups II and VI, or elements of Group IV, of the periodic table of the elements. One or more of the semiconductor compositions may be doped with elements having different valences or with one or more elements that change the refractive indices of the compositions in manners that are conventionally known to be useful for forming core and cladding regions of optical waveguides. The semiconductor compositions may further contain impurities of the types and concentrations that are conventionally known.

As examples, the semiconductor compositions for forming the optically conductive layers 108, 110, 112, 114 and 116 may include compound semiconductors such as indium-phosphide, indium-aluminum-arsenide, and indium-gallium-aluminum-arsenide. Further suitable inorganic compound semiconductors may include, for example, indium-gallium-arsenide, gallium arsenide, gallium nitride, aluminum nitride, indium nitride, gallium antimonide, indium antimonide, aluminum antimonide, aluminum gallium nitride, aluminum gallium arsenide, aluminum gallium antimonide, gallium aluminum antimonide, indium gallium antimonide, gallium arsenic antimonide, indium gallium phosphide, indium arsenic antimonide, indium gallium arsenide phosphide, indium aluminum gallium nitride, indium aluminum gallium antimonide. Other compound semiconductors, for example those including two or more of the elements appropriately selected from gallium, arsenic, indium, phosphorus, aluminum, nitrogen, antimony; or otherwise including Group IV, Groups II and VI, or Groups III and V elements, may also be used.

Compositions for forming the sidewall layers 120 and 122 may include, as examples, dielectric materials such as silicon nitride or silicon dioxide or amorphous silicon or any combination thereof, or other materials having a comparable or higher refractive index. The sidewall layers 120 and 122 may function to protect the lateral walls 132 and 134, and the distal lateral wall portions 136 and 138 of the optically conductive layer 112, against erosion by a wet etchant or other wet processing during fabrication of the ridge optical waveguide 100. As an example, the sidewall layers 120 and 122 may be formed from another composition that is resistant to a wet etchant that may be employed to remove portions of the optically conductive layer 112 to leave behind substantially planar top surfaces 144 and 146 on the optically conductive layer 108 as discussed below in connection with FIGS. 3-5.

A composition for forming the substrate layer 118 may be selected for its suitability in fabricating a layer that may function as a physical support for the ridge optical waveguide 100, while not adversely affecting the optical performance of the ridge optical waveguide. As an example, a composition may be selected for forming the substrate layer 118 that is not a conductor. A conductor thus located adjacent to the optically conductive layer 114 may result in loss of light from the ridge optical waveguide 100. In another example, a composition for forming the substrate layer 118 may include indium phosphide.

A composition for forming the protective layer 126 may be selected for its suitability in fabricating a layer that may function as a protective barrier for the optically conductive layer 116 against erosion by dry or wet etching or other dry or wet processing during fabrication of the ridge optical waveguide 100, while not adversely affecting the optical performance of the ridge optical waveguide. As an example, a composition may also be selected for forming the protective layer 126 that is not a conductor. A conductor thus located adjacent to the optically conductive layer 116 may result in loss of light from the ridge optical waveguide 100. In another example, a composition for forming the protective layer 126 may include a dielectric material such as silicon nitride or silicon dioxide or amorphous silicon or any combination thereof or other materials having a comparable or higher refractive index, as discussed above in connection with materials for fabricating the sidewall layers 120 and 122.

Overall dimensions of the ridge optical waveguide 100 may be selected dependant on the end-use application for a particular ridge optical waveguide. As an example, the core region as may be collectively formed by the optically conductive layers 108, 110 and 112 may have a thickness within a range of between about 100 nanometers ("nm") and about 800 nm in the directions of the arrow 124. In another example, a thickness of the optically conductive layer 108 may be within a range of between about 10 nm and about 75 nm in the directions of the arrow 124. In a further example, a thickness of each of the optically conductive layers 110 and 112 may be within a range of between about 45 nm and about 790 nm in the directions of the arrow 124. In a further example, a thickness of each of the optically conductive layers 114 and 116 may be within a range of between about 1 micrometer "$\mu$" and about 4$\mu$ in the directions of the arrow 124. In an additional implementation, a thickness of the substrate layer 118 may be within a range of between about 50$\mu$ and about 600$\mu$ in the directions of the arrow 124. In another example, a thickness of the protective layer 126 may be within a range of between about 50 nm and about 500 nm in the directions of the arrow 124. As an additional implementation, a width of the optically conductive layers 112 and 116 and the protective layer 126 may be within a range of between about 1$\mu$ and about 5$\mu$ in the directions of the arrow 106. As another example, a width of the optically conductive layers 108, 110 and 114 may be within a range of between about 2$\mu$ and about 2 millimeters ("mm") in the directions of the arrow 106. In a further implementation, a thickness of each of the sidewall layers 120 and 122 may be within a range of between about 10 nm and about 500 nm in the directions of the arrow 106. A collective thickness of the optically conductive layers 112 and 116 and the protective layer 126 in the directions of the arrow 124, defining a height of the optically conductive ridge region 102 located on the substantially planar substrate region 104, is greater than the thickness of each of the sidewall layers 120 and 122 in the same directions. It is understood that the ridge optical waveguide 100 may be elongated and formed to have any selected length generally in the directions of the arrow 148, and that the general directions of the arrow 148 may be modulated in the directions of the arrow 106 by lateral displacement of the optically conductive ridge region 102 on the substantially planar substrate region 104 at different points in the directions of the arrow 148.

In operation, the ridge optical waveguide 100 may be utilized to propagate light generally in either one or both of the directions of the arrow 148. Some of the light may propagate within the core region collectively formed by the optically conductive layers 108, 110 and 112; and some of the light may propagate within the cladding regions defined by the optically conductive layers 114 and 116. The optically conductive layer 112 may serve to guide light propagating in the optically conductive layers 108, 110 and 114 to predominately remain laterally in alignment with the optically conductive ridge region 102 in the directions of the arrow 148. A significant portion of the bandwidth of the light may propagate as so laterally guided within the optically conductive layers 108 and 110, which may have a greater width than the optically conductive layer 112 in the directions of the arrow 106.

The substrate layer 118 and the protective layer 126 may each be formed of compositions selected so as not to generate significant losses of light from the cladding regions defined by the optically conductive layers 114 and 116. Surfaces of the lateral walls 132 and 134 of the optically conductive layer 116 and the distal lateral wall portions 136 and 138 of the optically conductive layer 112 may be somewhat rough, due to their exposure to a dry etching process prior to fabrication of the sidewall layers 120 and 122, as discussed below in connection with FIGS. 3-5. However, the lateral walls 132 and 134 of the optically conductive layer 116 and the distal lateral wall portions 136 and 138 of the optically conductive layer 112 may be substantially smoother than they would be if exposed to a wet etchant process during formation of the substantially planar top surfaces 144 and 146 in the absence of the sidewall layers 120 and 122. This reduced roughness of the lateral walls 132 and 134 of the optically conductive layer 116 and of the distal lateral wall portions 136 and 138 of the optically conductive layer 112 may reduce losses of light from the optically conductive layers 112 and 116, resulting in an increased capability of the ridge optical waveguide 100 to transmit a light signal or beam generally in the directions of the arrow 148. Further, the substantially planar top surfaces 144 and 146 on the optically conductive layer 108 may reduce losses of light from the optically conductive layer 108. The proximal lateral wall portions 140 and 142 of the optically conductive layer 112 may be relatively rough compared with the distal lateral wall portions 136 and 138 of the optically conductive layer 112, due to exposure of the proximal lateral wall portions 140 and 142 to a wet etchant process. However, thicknesses of the proximal lateral wall portions 140 and 142 in the directions of the arrow 124 may constitute as little as about 10% of the thickness in the same direction of the optically conductive layer 112. Accordingly, losses of light from the optically conductive layer 112 caused by roughness of the proximal lateral wall portions 140 and 142 may be minimal.

Figure 2:
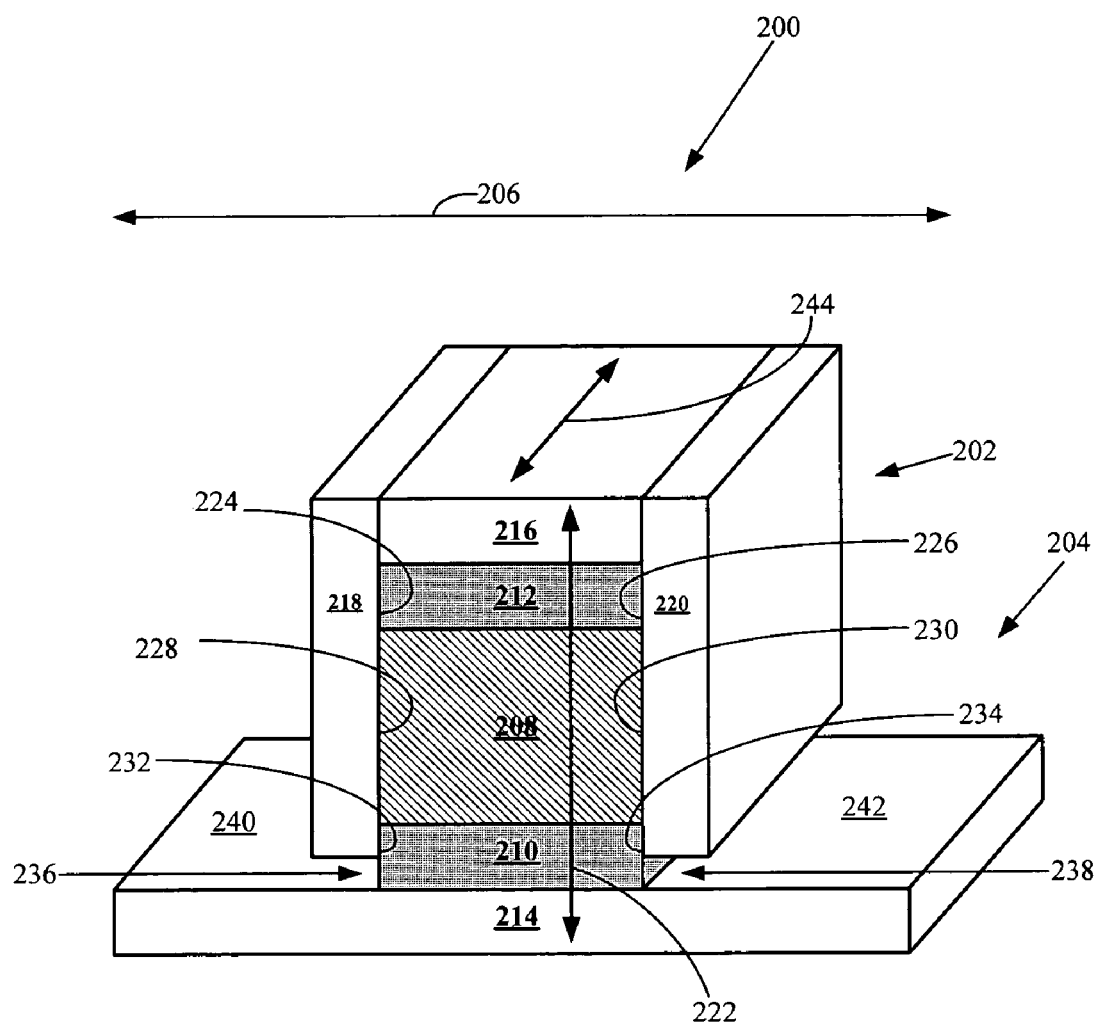
FIG. 2 is a cross-sectional perspective side view showing an example of an implementation of a mesa optical waveguide.

FIG. 2 is a cross-sectional perspective side view showing an example of an implementation of a mesa optical waveguide 200. The mesa optical waveguide 200 includes an optically conductive mesa region 202 and a substantially planar substrate region 204. A lateral width of the substantially planar substrate region 204 in the directions of the arrow 206 may be greater than a lateral width of the optically conductive mesa region 202 in the same directions. The optically conductive mesa region 202 may have an optically conductive layer 208 including a first semiconductor composition, located on an optically conductive layer 210 including a second semiconductor composition. The optically conductive mesa region 202 may also have an optically conductive layer 212 including the second semiconductor composition, located on the optically conductive layer 208. The refractive index of the first semiconductor composition is sufficiently higher than the refractive index of the second semiconductor composition so that the optically conductive layer 208 forms a core region and the optically conductive layers 210 and 212 form cladding regions for the optically conductive mesa region 202, as indicated by shading. As a further example, the optically conductive layers 210 and 212 may each include different semiconductor compositions, provided that each of such semiconductor compositions has a refractive index that is sufficiently lower than that of the first semiconductor composition so as to function as an optical cladding. In another example, the substantially planar substrate region 204 may include a substrate layer 214 on which the optically conductive layer 210 may be physically supported. As a further implementation, the optically conductive mesa region 202 may include a protective layer 216 on the optically conductive layer 212. The protective layer 216 may protect the optically conductive layer 212 against erosion by dry or wet etching or other dry or wet processing during fabrication of the mesa optical waveguide 200.

The optically conductive mesa region 202 further includes sidewall layers 218 and 220 each having a height in the directions of the arrow 222 that is less than the combined thickness in the same directions of optically conductive layers 210, 208, and 212, and if included, the protective layer 216. As an example, an aspect ratio of the combined average thickness in the directions of the arrow 222 of the optically conductive layers 210, 208, and 212, and the protective layer 216 if present, divided by an average width in the directions of the arrow 206 of each of the sidewall layers 218 and 220, is greater than 1:1.

The sidewall layers 218 and 220 may, as an example, adjoin lateral walls 224 and 226 of the optically conductive layer 212. As a further implementation, the sidewall layers 218 and 220 may also adjoin all or a portion in the directions of the arrow 222 of lateral walls 228 and 230 of the optically conductive layer 208. In another example, the sidewall layers 218 and 220 may additionally adjoin distal lateral wall portions 232 and 234 of the optically conductive layer 210. In another example, proximal lateral wall portions 236 and 238 of the optically conductive layer 210 may remain exposed adjacently to and in spite of the presence of the sidewall layers 218 and 220. The distal lateral wall portions 232 and 234 are farther away from the substantially planar substrate 214 than are the proximal lateral wall portions 236 and 238. The sidewall layers 218 and 220 may, as an example, protect the lateral walls 224 and 226 of the optically conductive layer 212, the lateral walls 228 and 230 of the optically conductive layer 208, and the distal lateral wall portions 232 and 234 of the optically conductive layer 210 against erosion by a wet etchant or other wet processing that may be employed to remove portions of a blank (shown in FIG. 4 discussed below) for the optically conductive layer 210 in order to leave behind substantially planar surfaces 240 and 242 on the substrate layer 214, during fabrication of the mesa optical waveguide 200 as further discussed below. The lateral walls 224 and 226 of the optically conductive layer 212, the lateral walls 228 and 230 of the optically conductive layer 208, and the distal lateral wall portions 232 and 234 of the optically conductive layer 210 may have surfaces that are smoother and less rough than they might have been had such portions of the optically conductive layers 212, 208 and 210 been exposed to a wet etchant during formation of the surfaces 240 and 242 in the absence of the sidewall layers 218 and 220. As another example, the optically conductive mesa region 202 may be covered with a dielectric layer (not shown) formed of inorganic or organic materials or of both inorganic and organic materials.

It is understood that the sidewall layers 218 and 220 may adjoin the lateral walls 224 and 226, and all or a portion in the directions of the arrow 222 of lateral walls 228 and 230 of the optically conductive layer 208, but may not adjoin distal lateral wall portions 232 and 234 of the optically conductive layer 210. It is further understood that the sidewall layers 218 and 220 may adjoin all or a portion in the directions of the arrow 222 of lateral walls 224 and 226 of the optically conductive layer 212, but may not adjoin the lateral walls 228 and 230 of the optically conductive layer 208 or the distal lateral wall portions 232 and 234 of the optically conductive layer 210. It is understood that the substrate layer 214 may be omitted. It is additionally understood that protection of the optically conductive layer 212 from a wet etching process may likewise be otherwise achieved and that the protective layer 216 may be omitted.

The chemical composition for forming the optically conductive layer 208 is selected to have a refractive index sufficiently greater than refractive indices of semiconductor compositions selected for forming the optically conductive layers 210 and 212 so that the optically conductive layer 208 can function as an optical waveguide core and so that the optically conductive layers 210 and 212 can function as an optical waveguide cladding. As earlier noted, the semiconductor compositions of the optically conductive layers 210 and 212 may as an example be different from each other, provided that their refractive indices are substantially equal to each other and suitable for forming an optical waveguide cladding for the optically conductive layer 208.

Compositions for forming the optically conductive layer 208 may be, as examples, inorganic semiconductor compositions as discussed with regard to formation of the optically conductive layers 108, 110 or 112, such semiconductor compositions being those that are known to be useful for forming core regions of optical waveguides. Compositions for forming the optically conductive layers 210 and 212 may be, as examples, inorganic semiconductor compositions as discussed with regard to formation of the optically conductive layers 114 or 116, such semiconductor compositions being those that are known to be useful for forming cladding regions of optical waveguides.

Compositions for forming the sidewall layers 218 and 220 may be those discussed above in connection with the sidewalls 120 and 122. The sidewall layers 218 and 220 may function to protect, in whole or part, the lateral walls 224, 226, 228 and 230, and the distal lateral wall portions 232 and 234, against erosion by a wet etchant or other wet processing during fabrication of the mesa optical waveguide 200.

A composition for forming the substrate layer 214 may be selected for its suitability in fabricating a layer that may function as a physical support for the mesa optical waveguide 200, while not adversely affecting the optical performance of the mesa optical waveguide. As an example, a composition may be selected for forming the substrate layer 214 as discussed above in connection with the substrate layer 118 of FIG. 1. A composition for forming the protective layer 216 may be selected for its suitability in fabricating a layer that may function as a protective barrier for the optically conductive layer 212 against erosion by a dry or wet etchant or other dry or wet processing during fabrication of the mesa optical waveguide 200, while not adversely affecting the optical performance of the mesa optical waveguide. As an example, a composition may be selected for forming the protective layer 216 as discussed above in connection with the protective layer 126 of FIG. 1.

Overall dimensions of the mesa optical waveguide 200 may be selected dependant on the end-use application for a particular mesa optical waveguide. As an example, the core region formed by the optically conductive layer 208 may have a thickness within a range of between about 100 nm and about 800 nm in the directions of the arrow 222. In a further example, a thickness of each of the optically conductive layers 212 and 210 may be within a range of between about 1µ and about 4µ in the directions of the arrow 222. In an additional implementation, a thickness of the substrate layer 214 may be within a range of between about 50 micrometers "µ" and about 600µ in the directions of the arrow 222. In another example, a thickness of the protective layer 216 may be within a range of between about 50 nm and about 500 nm in the directions of the arrow 222. As an additional implementation, a width of the optically conductive layers 212, 208 and 210 and the protective layer 216 may be within a range of between about 1µ and about 5µ in the directions of the arrow 206. In a further implementation, a thickness of each of the sidewall layers 218 and 220 may be within a range of between about 10 nm and about 500 nm in the directions of the arrow 206. As an example, a collective thickness of the optically conductive layers 210, 208 and 212 and the protective layer 216 in the directions of the arrow 222, defining a height of the optically conductive mesa region 202 located on the substantially planar substrate region 204, may be greater than the thickness of each of the sidewall layers 218 and 220 in the same directions. It is understood that the mesa optical waveguide 200 may be elongated and formed to have any selected length generally in the directions of the arrow 244, and that the general directions of the arrow 244 may be modulated in the directions of the arrow 206 by lateral displacement of the optically conductive mesa region 202 on the substantially planar substrate region 204 at different points in the directions of the arrow 244.

In operation, the mesa optical waveguide 200 can be utilized to propagate light generally in either one or both of the directions of the arrow 244. Some of the light may propagate within the core region formed by the optically conductive layer 208, and some of the light may propagate within the cladding regions defined by the optically conductive layers 210 and 212. The substrate layer 214 and the protective layer 216 may each be formed of compositions selected so as not to generate significant losses of light from the cladding regions defined by the optically conductive layers 210 and 212.

Surfaces of the lateral walls 224, 226, 228 and 230 and the distal lateral wall portions 232 and 234 may be somewhat rough, due to their exposure to a dry etching process prior to fabrication of the sidewall layers 218 and 220, as discussed below in connection with FIGS. 3, 4 and 6. However, the lateral walls 224, 226, 228 and 230 and the distal lateral wall portions 232 and 234 may be substantially smoother than they would be if exposed to a wet etchant process in the absence of the sidewall layers 218 and 220. This reduced roughness of the lateral walls 224, 226, 228 and 230 and of the distal lateral wall portions 232 and 234 may reduce losses of light from the optically conductive layers 212, 208 and 210, resulting in an increased capability of the mesa optical waveguide 200 to transmit a light signal or beam generally in the directions of the arrow 244.

Figure 3:
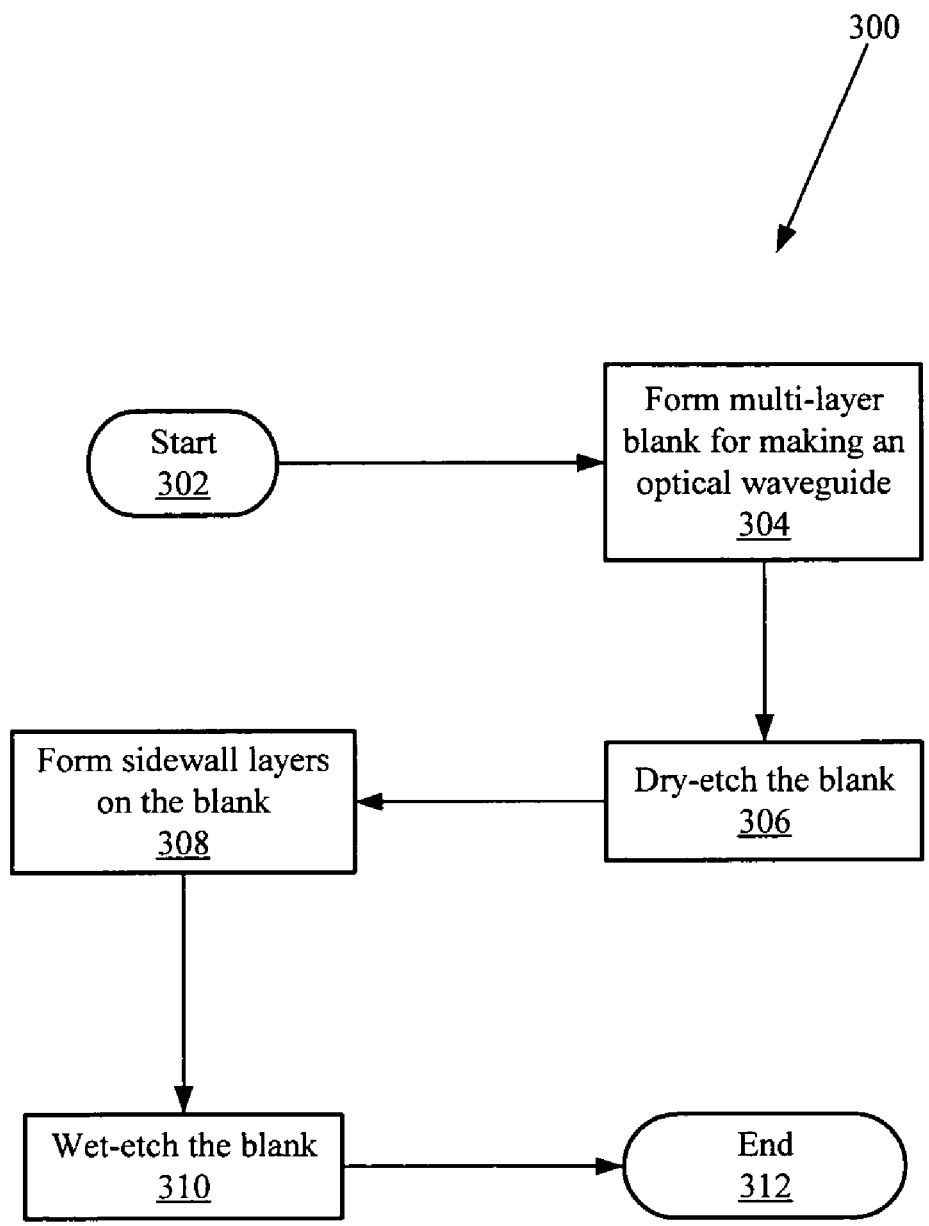
FIG. 3 is a flow chart showing a process for fabricating the ridge optical waveguide of FIG. 1 and the mesa optical waveguide of FIG. 2.
Figure 4:
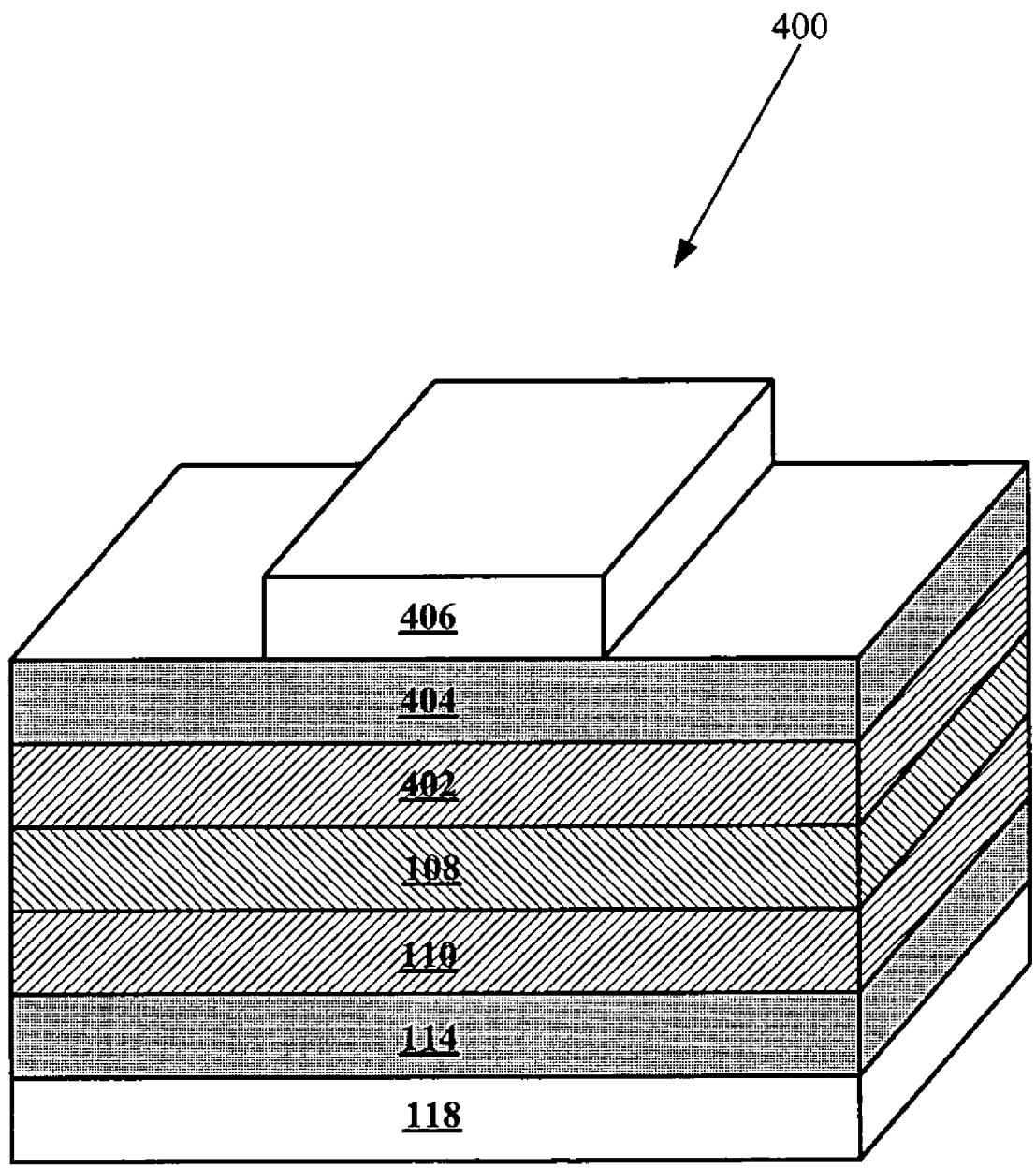
FIG. 4 is a cross-sectional perspective side view showing a multi-layer blank for forming the ridge optical waveguide shown in FIG. 1 or the mesa optical waveguide shown in FIG. 2.
Figure 5:
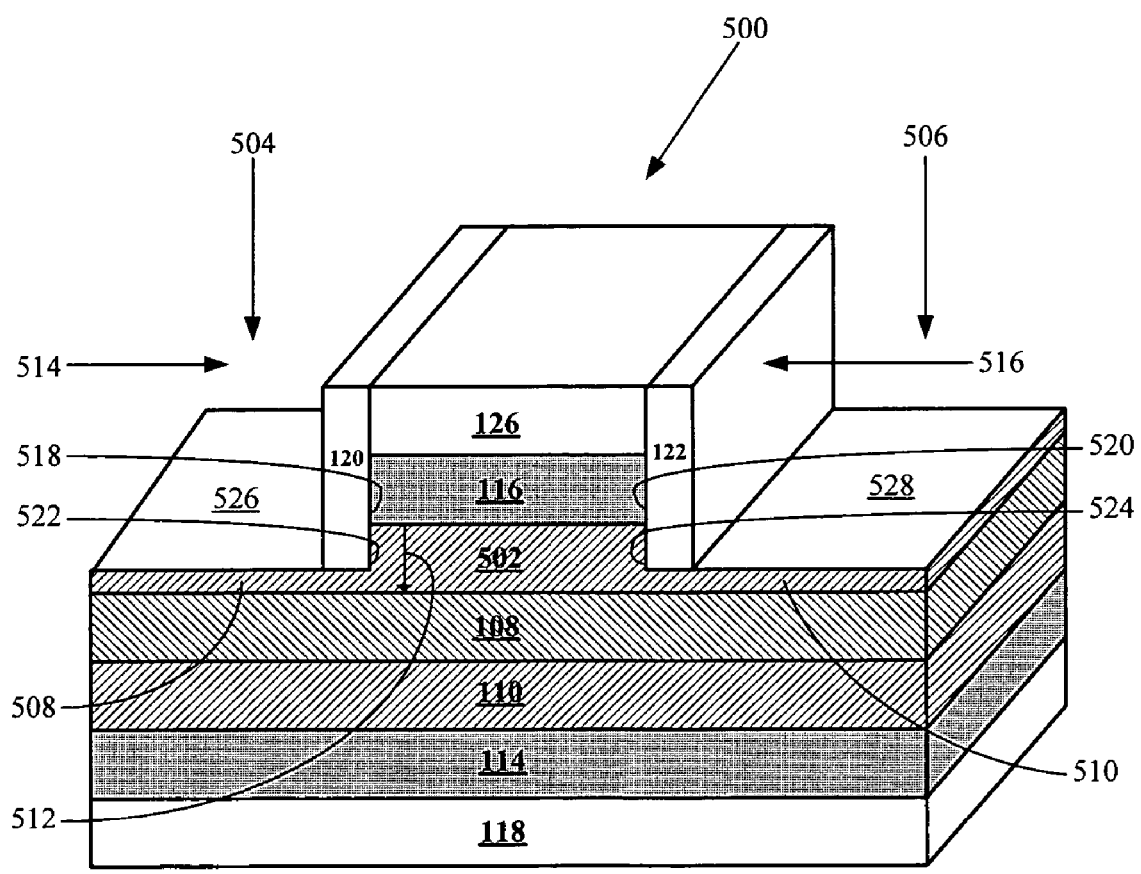
FIG. 5 is a cross-sectional perspective side view showing the ridge optical waveguide of FIG. 1 in the form of a blank 500 at a stage of partial fabrication.

FIG. 3 is a flow chart showing a process 300 for fabricating the ridge optical waveguide 100 of FIG. 1 and the mesa optical waveguide of FIG. 2. FIG. 4 is a cross-sectional perspective side view showing a multi-layer blank 400 for forming the ridge optical waveguide 100 shown in FIG. 1 or the mesa optical waveguide 200 shown in FIG. 2. FIG. 5 is a cross-sectional perspective side view showing the ridge optical waveguide 100 of FIG. 1 in the form of a blank 500 at a stage of partial fabrication. FIG. 6 is a cross-sectional perspective side view showing the mesa optical waveguide 200 of FIG. 2 in the form of a blank 600 at a stage of partial fabrication.

Implementation of the process 300 in forming the ridge optical waveguide 100 is first discussed. The process 300 starts at step 302, and at step 304 a multi-layer blank 400 shown in FIG. 4 may be formed for making the ridge optical waveguide 100. The multi-layer blank 400 may include, successively formed on the substrate layer 118, the optically conductive layers 114, 110 and 108, having layer compositions as earlier discussed. The substrate layer 118 may itself either be prefabricated or may be formed by a molding or coating or deposition process or the like. As an example, the substrate layer 118 may be cut from a bulk crystal grown by what is known as the liquid-encapsulated Czochralski method or by what is known as the gradient freeze crystal growth method. The optically conductive layers 114, 110 and 108 may likewise successively be formed on the substrate layer 118. In an example, a deposition process such as metal-organic chemical vapor deposition ("MOCVD") or molecular beam epitaxy ("MBE") may be used to form the optically conductive layers 114, 110 and 108. A blank 402 for forming the optically conductive layer 112 may then be formed on the optically conductive layer 108, having a composition as earlier discussed regarding the optically conductive layer 112. A blank 404 for forming the optically conductive layer 116 may then be formed on the blank 402, having a composition as earlier discussed regarding the optically conductive layer 116. A blank 406 for forming the protective layer 126 may be formed on the blank 404, having a layer composition as earlier discussed. In an example, the blank 406 may be formed as shown in FIG. 4 on the blank 404 having selected final lateral dimensions of the protective layer 126 in the directions of the arrow 106 shown in FIG. 1, so that subsequent shaping of the protective layer 126 may be unnecessary. In an implementation, a photolithographic masking process may be utilized to control the dimensions of the protective layer 126 to its selected final form. Formation of the protective layer 126 having its selected final dimensions may facilitate completion of dry etching step 306 of the process 300 next discussed, as a composition may be selected for forming the protective layer 126 that may be resistant to a dry etching process. In an alternative example (not shown) the protective layer 126 may be formed as part of a blank having dimensions substantially equal to those of the blank 404, and may then be shaped to its final dimensions. As an example, such shaping may be carried out by reactive ion etching ("RIE") or deep reactive ion etching ("DRIE"). It is appreciated that the above-discussed order of operations within step 304 for forming the blank 400 may be changed without departing from the process.

In step 306, a dry etching process is used to form the optically conductive layer 116 from the blank 404, as part of the blank 500 in its form as shown in FIG. 5. In particular, the dry etching process produces a ridge on the free surface of the blank 404 by removing portions of the blank that are unprotected by a mask. The dry etch may stop prior to removal of the entire thickness of that part of the blank 404 that is not covered by the mask. The dry etching process may then be continued to partially form the optically conductive layer 112, resulting in the blank 502 for the optically conductive layer 112 shown in FIG. 5. The dry etching process may be, as an example, a RIE process, such as a DRIE process. The dry etching process may be carried out generally in the directions of the arrows 504 and 506 shown in FIG. 5. The protective layer 126 may prevent erosion of portions of the blank 502 during execution of the dry etching or other dry processing. An endpoint for the dry etching process may be detected before complete removal of the blank 402 has taken place in the regions 508 and 510 of the blank 502, and the dry etching process may then be terminated. Such an endpoint for the dry etching process may be selected, as an example, because dry etching processes may be unsuitable for precisely ending anisotropic etching of the blank 502 above the optically conductive layer 108 to leave the substantially planar top surfaces 144 and 146 shown in FIG. 1. In an example, the dry etching process may be permitted to continue until up to about 90% of a thickness of the blank 502 in the direction of the arrow 512 has been removed. Dry etching may, however, generally be anisotropically focused in the directions of the arrows 504 and 506, so that minimal etching may occur during the dry etching process in the directions of the arrows 514 and 516. The anisotropic dry etching process may leave relatively smooth lateral walls 518 and 520 on the optically conductive layer 116, and may similarly leave relatively smooth distal lateral wall portions 522 and 524 on the resulting blank 502.

The regions 508 and 510 of the blank 502 may have relatively rough surfaces 526 and 528, due to stopping the dry etching process on these surfaces. These rough surfaces 526 and 528 may cause significant losses of propagating light if the blank 500 is used as an optical waveguide in the form as shown in FIG. 5. In an example, the regions 508 and 510 of the blank 502 may thus need to be removed in order to complete formation of the optically conductive layer 112 and reduce such losses of light. The regions 508 and 510 of the blank 502 may need to be removed in such a manner so that substantially planar top surfaces 144 and 146 of the optically conductive layer 108 remain, thus reducing such losses of light. A wet etching process may be utilized to perform such a removal of the regions 508 and 510, using an etching composition that may erode the regions 508 and 510, but may erode the optically conductive layer 108 either much more slowly or substantially not at all. The inclusion of optically conductive layers 112 and 108 within a core region for the ridge optical waveguide 100 having substantially equal refractive indices but different semiconductor compositions facilitates this selective wet etching process in the directions of the arrows 504 and 506. However, a wet etching process may isotropically erode the blank 502, so that the lateral walls 518 and 520 on the optically conductive layer 116 and the distal lateral wall portions 522 and 524 on the blank 502 may need to be protected from wet etching in the directions of the arrows 514 and 516.

In step 308, sidewall layers 120 and 122 are formed on lateral surfaces of the ridge formed by the dry etch, in the blank 500. In an example, blanks (not shown) for forming the sidewall layers 120 and 122 may be deposited onto the blank 500 adjacent to the lateral walls 518 and 520 and the distal lateral wall portions 522 and 524, and then shaped by a dry etching process to the dimensions as shown in FIG. 5. As examples, the blanks may be deposited onto the blank 500 by MOCVD or MBE, and then dry etched by an RIE or DRIE process. In an example, the sidewall layers 120 and 122 may be formed from SiN in deuterated silane ($SiD_4$) and deuterated ammonia ($ND_3$). Deuterium may be substituted for hydrogen, because silicon-hydrogen atomic bonds absorb light at 1550 nanometers, the standard wavelength generally used for telecommunications. Hence, silicon-hydrogen atomic bonds in optical waveguides may cause attenuation of light in the optical waveguides. Substitution of deuterium may minimize this problem.

In step 310, a wet etching process is utilized to complete formation of the ridge optical waveguide 100. In particular, the wet etch removes remaining portions of the optically conductive layer 112 in the directions of the arrows 504 and 506, and stops on the substantially planar top surfaces 144 and 146 of the optically conductive layer 108. For that reason, the wet etch produces surfaces 144 and 146 adjacent to the ridge. During the wet etch, the sidewall layers 120 and 122 protect the lateral walls 132 and 134 and the distal lateral wall portions 136 and 138 from being etched.

A wet etchant composition may be deposited on the rough surfaces 526 and 528, and allowed to erode the regions 508 and 510 of the blank 502 to yield substantially planar top surfaces 144 and 146. As examples, the wet etchant composition may include hydrogen peroxide, phosphoric acid, and water, in respective ratios by volume within a range of about 1:1:10 and about 1:1:100. In an implementation, the wet etchant composition may include, by volume, about 1 part hydrogen peroxide, about 1 part phosphoric acid, and about 30 parts water. (1:1:30). The sidewall layers 120 and 122, together with the protective layer 126, may protect the lateral walls 518 and 520 of the optically conductive layer 116 and the distal lateral wall portions 522 and 524 of the blank 502 from erosion by the wet etchant or other wet processing during fabrication of the ridge optical waveguide 100. Although some erosion of the blank 502 may occur along the proximal lateral wall portions 140 and 142 of the resulting optically conductive layer 112, this erosion may be minimal as most of the thickness of the blank 502 in the direction of the arrow 512 may be protected by the sidewall layers 120 and 122. The process 300 then ends at step 312.

The process 300 can also be utilized to form a modified blank 400 that may be utilized to form the mesa optical waveguide 200. The process 300 starts at step 302, and at step 304 the multi-layer blank 400 shown in FIG. 4 may be formed with modifications for making the mesa optical waveguide 200. As an example, the modified multi-layer blank 400 may include a substrate layer 118, serving as the substrate 214 of the mesa optical waveguide 200. An optically conductive layer 114 may be formed on the substrate layer 118, serving as a blank for making the optically conductive layer 210. A blank 402 for forming the optically conductive layer 208 may then be formed on the optically conductive layer 114. In an implementation, the layers 108 and 110 of the blank 400 as shown in FIG. 4 may be omitted. A blank 404 for forming the optically conductive layer 212 may then be formed on the blank 402. A blank 406, for forming the protective layer 216, may be formed on the blank 404.

The substrate layer 118 and the optically conductive layer 114 of the blank 400 may respectively have the compositions discussed above in connection with the substrate 118 and optically conductive layer 114 of FIG. 1. The blank 402 may have a composition as discussed above in connection with one of the optically conductive layers 110, 108 and 112 of FIG. 1. The blank 404 may have a composition as discussed above in connection with the optically conductive layer 116 of FIG. 1. The blank 406 may have a composition as discussed above in connection with the protective layer 126 of FIG. 1. The layers and blanks of the modified blank 400 may be formed in the same manners as discussed above in connection with utilization of the process 300 to form the blank 400 and the ridge optical waveguide 100 of FIG. 1.

Figure 6:
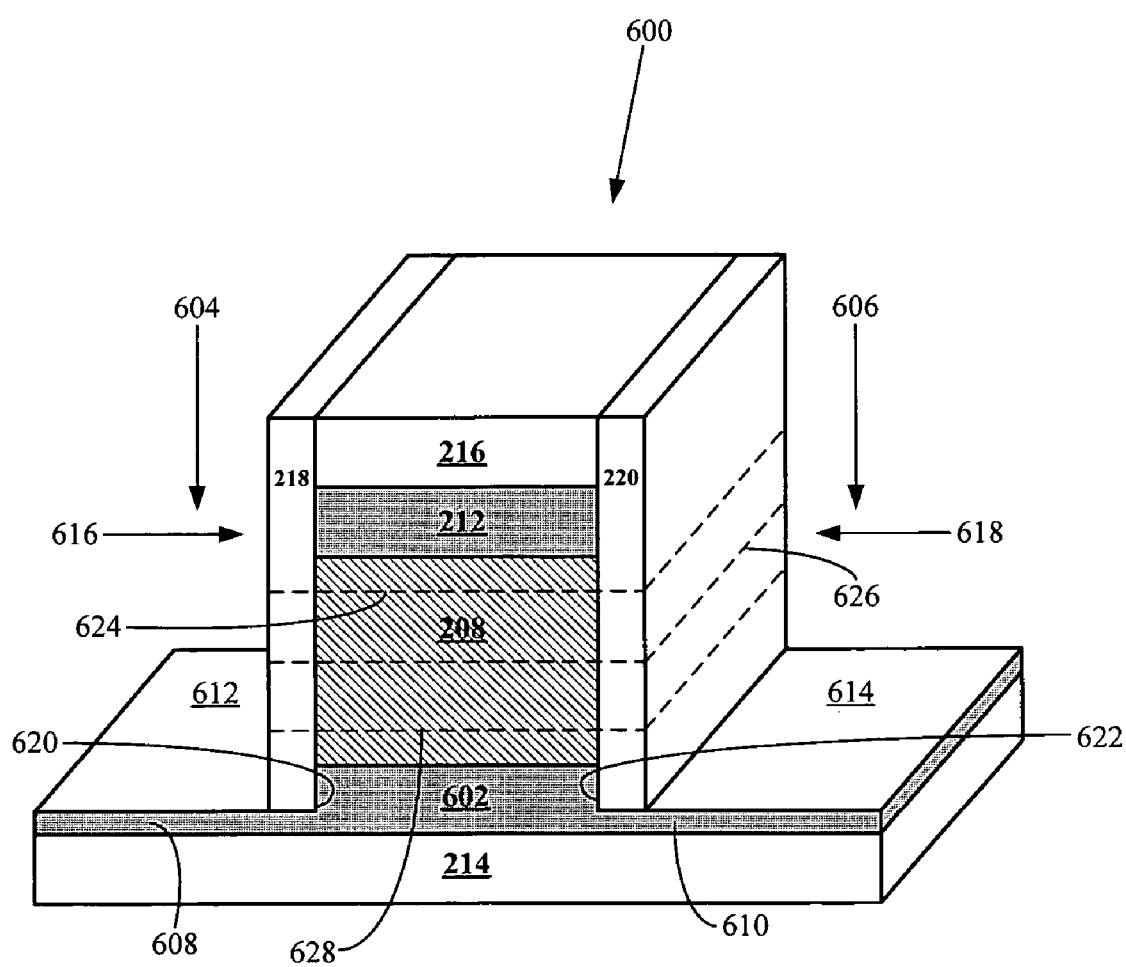
FIG. 6 is a cross-sectional perspective side view showing the mesa optical waveguide 200 of FIG. 2 in the form of a blank 600 at a stage of partial fabrication.

In step 306, a dry etching process is used to form the optically conductive layer 212 from the blank 404, as part of the blank 600 in its form as shown in FIG. 6. The dry etching process may also be used to form the optically conductive layer 208 from the blank 402. The dry etching process may then be continued to partially form the optically conductive layer 210 in the form of the blank 602 shown in FIG. 6. In particular, the dry etching process may produce a mesa on the free surface of the substrate 214 by successively removing portions of the layers 404, 402 and 114 that are unprotected by a mask (not shown) on the protective layer 216. The dry etching process may be carried out in the directions of the arrows 604 and 606 shown in FIG. 6. The dry etch may be stopped prior to removal of the entire thickness, in the directions of the arrows 604 and 606, of portions of the optically conductive layer 114 that are not covered by the mask. The dry etching process may be, as an example, a RIE process, such as a DRIE process. An endpoint for the dry etching process may be detected before complete removal of portions of the optically conductive layer 114 in the regions 608 and 610 has taken place, yielding the blank 602 having rough surfaces 612 and 614. Dry etching may be anisotropically focused in the directions of the arrows 604 and 606, so that minimal etching may occur during the dry etching process in the lateral directions of the arrows 616 and 618. The anisotropic dry etching process may leave relatively smooth lateral walls on the optically conductive layers 212 and 208, and may similarly leave relatively smooth distal lateral wall portions 620 and 622 on the resulting blank 602. In an implementation, the dry etch may be stopped at a selected point in the directions of the arrows 604 and 606 that may be earlier in the etch and above the rough surfaces 612 and 614, and may as examples be stopped at one of the points schematically indicated by the dotted lines 624, 626 and 628.

In step 308, sidewall layers 218 and 220 are formed on lateral surfaces of the mesa formed by the dry etch, in the blank 600. In an example, blanks (not shown) for forming the sidewall layers 218 and 220 may be deposited onto the blank 600 adjacent to all or portions of the lateral walls of the layers 212 and 208, and may also be deposited onto the blank 600 adjacent to distal lateral wall portions 620 and 622 of the blank 602. The sidewall layers 218 and 220 may be formed from the same compositions and in the same manner as discussed above in connection with FIG. 5.

In step 310, a wet etching process is utilized to complete formation of the mesa optical waveguide 200. In particular, the wet etch may remove any remaining portions, as selected, of any or all of the layers 404, 402 and 114 in the directions of the arrows 604 and 606 to a selected point. As an example, the wet etching process may be stopped on the substantially planar top surfaces 240 and 242 of the substrate 214. The process 300 then ends at step 312.

Figure 7:
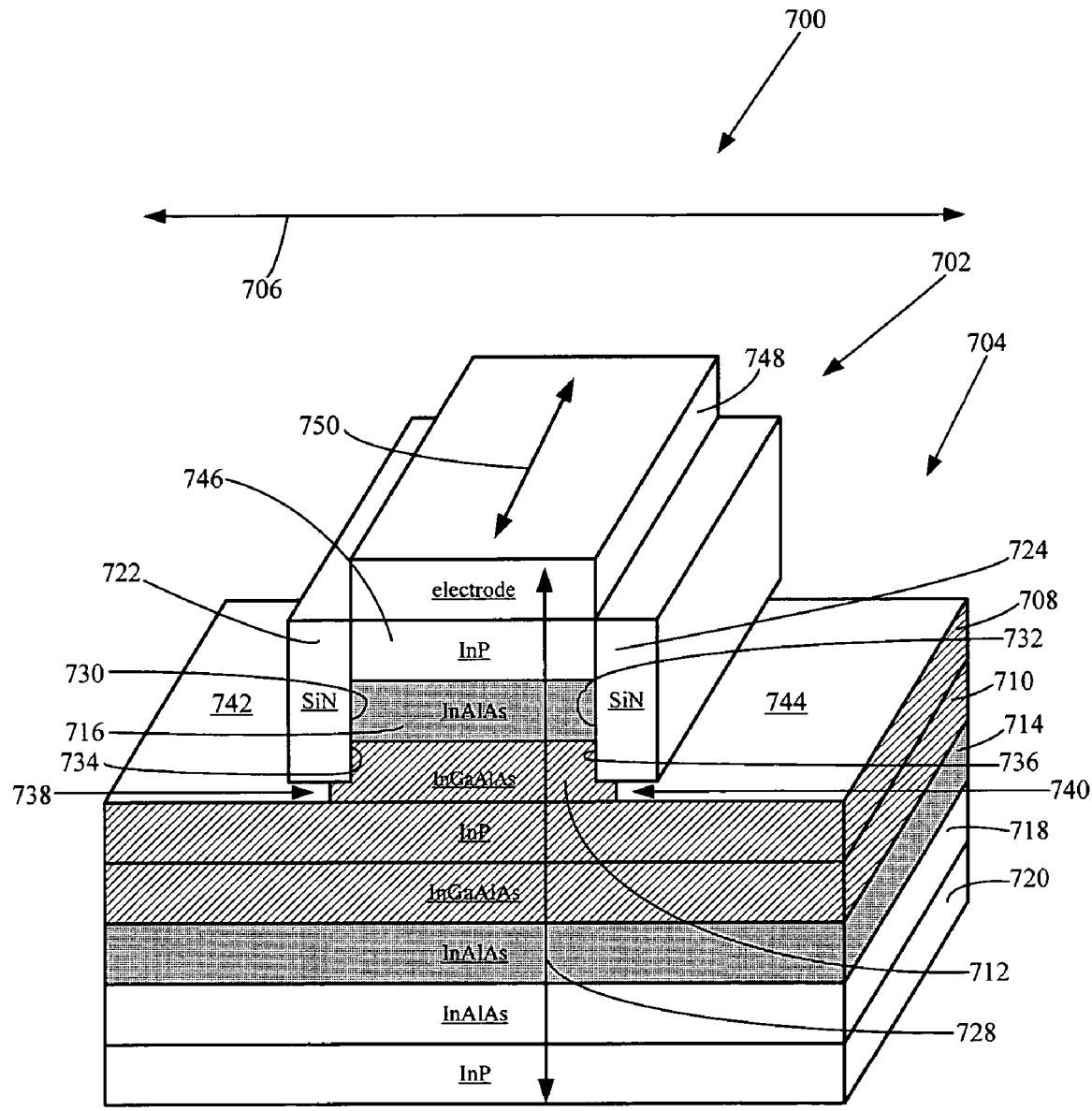
FIG. 7 is a cross-sectional perspective side view showing an example of an implementation of another ridge optical waveguide.

FIG. 7 is a cross-sectional perspective side view showing an example of an implementation of another ridge optical waveguide 700. The ridge optical waveguide 700 includes an optically conductive ridge region 702 and a substantially planar substrate region 704. A width of the substantially planar substrate region 704 in the directions of the arrow 706 may be greater than a lateral width of the optically conductive ridge region 702 in the same direction. The substantially planar substrate region 704 may have an optically conductive layer 708 including a first semiconductor composition located on an optically conductive layer 710 including a second semiconductor composition. In an example, the optically conductive layer 708 may be formed from a composition including indium-phosphide ("InP"), and the optically conductive layer 710 may be formed from a composition including indium-gallium-aluminum-arsenide ("InGaAlAs"). The optically conductive ridge region 702 may have an optically conductive layer 712 also including the second semiconductor composition, located on the optically conductive layer 708. In an example, the optically conductive layer 712 may be formed from a composition including InGaAlAs. The refractive indices of the first and second semiconductor compositions may be substantially equal, while their semiconductor compositions are different. As an example, the refractive index of InGaAlAs, having a In molar fraction of about 0.529 and a Ga molar fraction of about 0.335, is about 3.39 at a wavelength of about 1550 nm. As another example, the refractive index of InP is about 3.23 at a wavelength of about 1550 nm. Accordingly, the two optically conductive layers 710 and 712 including the second semiconductor composition, together with the interposed optically conductive layer 708 including the first semiconductor composition, may collectively define a core region for the ridge optical waveguide 700 as indicated by hatching.

The substantially planar substrate region 704 may further have an optically conductive layer 714 including a third semiconductor composition, on which the optically conductive layer 710 may be located. The optically conductive ridge region 702 may further have an optically conductive layer 716 including the third semiconductor composition, under which the optically conductive layer 712 may be located. In an example, optically conductive layers 714 and 716 may each be formed from a composition including InAlAs ("InAlAs"). The refractive index of the third semiconductor composition may be lower than the refractive indices of the first and second semiconductor compositions. As an example, the refractive index of indium-gallium-arsenide, having an In molar fraction of about 0.52, is about 3.22 at a wavelength of 1550 nm, which is lower than the refractive index of InGaAlAs. Accordingly, the two optically conductive layers 714 and 716 may together define a cladding region for the ridge optical waveguide 700 as indicated by shading. As another example, the optically conductive layers 710 and 712 may each include different semiconductor compositions, provided that each of such semiconductor compositions has a refractive index substantially equal to that of the first semiconductor composition. As a further example, the optically conductive layers 714 and 716 may each include different semiconductor compositions, provided that each of such semiconductor compositions has a refractive index that is sufficiently lower than that of the first semiconductor composition so as to function as an optical cladding.

In another example, the optically conductive layer 714 may be physically supported on a layer 718. In an additional example, the layer 718 may be physically supported on a layer 720. In an example, the layer 718 may be formed from a composition including doped InAlAs, and the layer 720 may be formed from a composition including InP. As an example, the ridge optical waveguide 700 may be integrated into a phase modulator (not shown), and the layer 718 may function to modulate an electric field in the phase modulator. In that case, the optically conductive layer 716 may serve to establish an electric field, and the optically conductive layer 714 may serve to isolate the optically conductive layer 710 from the layer 718. Suitable phase modulators into which the ridge optical waveguide 700 may be incorporated are disclosed, for example, in Chen et al. U.S. Published Patent Application No. 2005/0068887, filed on Sep. 30, 2003 and entitled "High Speed Modulation of Optical Subcarriers", the entirety of which hereby is incorporated herein by reference. It is understood that the semiconductor compositions for the layers shown in FIG. 7 and discussed above are non-limiting examples and that other materials as discussed in connection with FIG. 1 may be included or substituted. It is understood that either or both of the layer 718 and the layer 720 may be omitted. It is further understood that the optically conductive layer 710 may be omitted.

The optically conductive ridge region 702 further includes sidewall layers 722 and 724 each having a height in the directions of the arrow 728 that is less than the combined thickness in the same directions of optically conductive layers 712 and 716. As an example, an aspect ratio of the combined average thickness in the directions of the arrow 728 of the optically conductive layers 712 and 716, and the layer 746 if present, divided by an average width in the directions of the arrow 706 of each of the sidewall layers 722 and 724, is greater than 1:1. Compositions for forming the sidewall layers 722 and 724 may include, as examples, dielectric materials such as silicon nitride or silicon dioxide or amorphous silicon or any combination thereof, or other materials having a comparable or higher refractive index. The sidewall layers 722 and 724 may adjoin lateral wall portions 730 and 732 of the optically conductive layer 716. The sidewall layers 722 and 724 may also adjoin distal lateral wall portions 734 and 736 of the optically conductive layer 712. Proximal lateral wall portions 738 and 740 of the optically conductive layer 712 may remain exposed adjacently to and in spite of the presence of the sidewall layers 722 and 724. The distal lateral wall portions 734 and 736 are farther away from the optically conductive layer 708 than are the proximal lateral wall portions 738 and 740. The sidewall layers 722 and 724 may, as an example, protect the lateral wall portions 730 and 732 of the optically conductive layer 716 and the distal lateral wall portions 734 and 736 of the optically conductive layer 712 against erosion by a wet etchant or other wet processing that may be employed to remove portions of a blank (shown in FIG. 9 discussed below) for the optically conductive layer 712 to leave behind substantially planar top surfaces 742 and 744 on the optically conductive layer 708, during fabrication of the ridge optical waveguide 700 as further discussed below. The lateral wall portions 730 and 732 of the optically conductive layer 716 and the distal lateral wall portions 734 and 736 of the optically conductive layer 712 may accordingly have surfaces that are smoother and less rough than they might have been had such portions of the optically conductive layer 712 been removed by a wet etchant in the absence of the sidewall layers 722 and 724. In an example, up to about 90% of a thickness of the optically conductive layer 712 in the directions of the arrow 728 may be protected by the sidewall layers 722 and 724 against erosion by a wet etchant or other wet processing during fabrication of the ridge optical waveguide 700.

As another example, a layer 746 may be located on the optically conductive layer 716. In an example, the layer 746 may be formed from a composition including InP. The layer 746 may protect the optically conductive layer 716 against erosion by dry or wet etching or other dry or wet processing during fabrication of the ridge optical waveguide 700. It is understood that the layer 746 may be omitted.

In a further example, an electrode may be located in a layer 748 on the layer 746. Such an electrode may form part of a phase modulator as earlier discussed. In this example, the layer 746 interposed between the layer 748 and the optically conductive layer 716 may prevent losses of light from the cladding region of the ridge optical waveguide 700 that might occur if the layer 748 including the electrode were located in direct contact with the optically conductive layer 716. It is understood that lateral positioning of an electrode in the layer 748 in the directions of the arrow 706 may be determined as part of a structure for such a phase modulator. It is further understood that the layer 748 may be omitted. As an example, the optically conductive ridge region 702 may be covered with a dielectric layer (not shown) formed of inorganic or organic materials or of both inorganic and organic materials.

The semiconductor compositions for forming the optically conductive layers 708, 710 and 712 may be selected to have refractive indices sufficiently greater than refractive indices of semiconductor compositions selected for forming the optically conductive layers 714 and 716 so that the optically conductive layers 708, 710 and 712 may function as an optical waveguide core and so that the optically conductive layers 714 and 716 may function as an optical waveguide cladding.

Semiconductor compositions for forming the optically conductive layers 708, 710, 712, 714 and 716 may be, as examples, compositions as discussed above in connection with forming the optically conductive layers 108, 110, 112, 114 and 116, respectively. In an example, a semiconductor composition for forming the optically conductive layer 712 is selected that may be readily etched by a wet etching composition; and a semiconductor composition for forming the optically conductive layer 708 is selected that may be resistant to etching by the wet etching composition. The optically conductive layer 708 may then function as a barrier to a wet etching process as further discussed below in connection with FIGS. 8-10. As a further example, semiconductor compositions for forming the optically conductive layers 716 and 712 may be selected that may be readily etched by a dry etching process as further discussed below in connection with FIGS. 8-10.

Compositions for forming the sidewall layers 722 and 724 may include, as examples, compositions as discussed above in connection with forming the sidewall layers 120 and 122, respectively. The sidewall layers 722 and 724 may function to protect the lateral wall portions 730 and 732 of the optically conductive layer 716, and the distal lateral wall portions 734 and 736 of the optically conductive layer 712, against erosion by wet etching or other wet processing during fabrication of the ridge optical waveguide 700. In an example, the sidewall layers 722 and 724 may be formed of a composition including a dielectric material such as silicon nitride or silicon dioxide or amorphous silicon or any combination thereof, or other materials having a comparable or higher refractive index. As an example, the sidewall layers 722 and 724 may be formed from another composition that is resistant to a wet etching process that may be employed to remove portions of the optically conductive layer 712 to leave behind substantially planar top surfaces 742 and 744 on the optically conductive layer 708 as discussed below in connection with FIGS. 8-10. Compositions for forming the layer 718 and the layer 746 may be selected from compositions as discussed above in connection with forming substrate layer 118 and protective layer 126, respectively.

Overall dimensions of the ridge optical waveguide 700 may be selected in the same manner as discussed above in connection with corresponding layers of the ridge optical waveguide 100, except with regard to the layers 718, 720, and 748. In an implementation, a thickness of the layer 718 may be within a range of between about 100 nm and about 1,000μ in the directions of the arrow 728. In another example, a thickness of the layer 720 may be within a range of between about 100μ and about 600μ in the directions of the arrow 728. In an additional example, a thickness of the layer 748 may be within a range of between about 90 nm and about 510 nm in the directions of the arrow 728. As an implementation, the layer 748 may include four layers in succession on the layer 746, including, in increasing distance from the optically conductive layer 716: a chromium layer having a thickness within a range of between about 10 nm and about 40 nm; a platinum layer having a thickness within a range of between about 20 nm and about 70 nm; a gold layer having a thickness within a range of between about 40 nm and about 300 nm; and a palladium layer having a thickness within a range of between about 20 nm and about 100 nm. As an additional implementation, a width of the layers 718 and 720 may be the same as that of the optically conductive layer 114 in the directions of the arrow 706. As another example, a width of the layer 748 may be the same as that of the layer 746 in the directions of the arrow 706. As an example, a collective thickness of the layers 712, 716, 746 and 748 in the directions of the arrow 728, defining a height of the optically conductive ridge region 702 located on the substantially planar substrate region 704, may be greater than the thickness of each of the sidewall layers 722 and 724 in the same directions. It is understood that the ridge optical waveguide 700 may be elongated and formed to have any selected length generally in the directions of the arrow 750, and that this general direction may be modulated in the directions of the arrow 706 by lateral displacement of the optically conductive ridge region 702 on the substantially planar substrate region 704 at different points generally in the directions of the arrow 750.

In operation, the ridge optical waveguide 700 can be utilized to propagate light generally in either one or both of the directions of the arrow 750. Some of the light may propagate within the core region collectively formed by the optically conductive layers 708, 710 and 712; and some of the light may propagate within the cladding regions defined by the optically conductive layers 714 and 716. The optically conductive layer 712 may serve to guide light propagating in the optically conductive layers 708, 710 and 714 to predominately remain laterally in alignment with the optically conductive ridge region 702 in the directions of the arrow 750. A significant portion of the bandwidth of the light may propagate as so laterally guided within the optically conductive layers 708 and 710, which may have a greater width than the optically conductive layer 712 in the directions of the arrow 706. The layer 718 and the layer 746 may each be formed of compositions selected so as not to generate significant losses of light from the cladding regions defined by the optically conductive layers 714 and 716.

Surfaces of the lateral wall portions 730 and 732 of the optically conductive layer 716 and the distal lateral wall portions 734 and 736 of the optically conductive layer 712 may be somewhat rough, due to their exposure to a dry etching process prior to fabrication of the sidewall layers 722 and 724, as discussed below in connection with FIGS. 8-10. However, the lateral wall portions 730 and 732 of the optically conductive layer 716 and the distal lateral wall portions 734 and 736 of the optically conductive layer 712 may be substantially smoother than they would be if exposed to a wet etching process during the formation of the substantially planar top surfaces 742 and 744 in the absence of the sidewall layers 722 and 724. This reduced roughness of the lateral wall portions 730 and 732 of the optically conductive layer 716 and of the distal lateral wall portions 734 and 736 of the optically conductive layer 712 may reduce losses of light from the optically conductive layers 712 and 716, resulting in an increased capability of the ridge optical waveguide 700 to transmit a light signal or beam generally in the directions of the arrow 750. Further, the substantially planar top surfaces 742 and 744 on the optically conductive layer 708 may reduce losses of light from the optically conductive layer 708. The proximal lateral wall portions 738 and 740 of the optically conductive layer 712 may be relatively rough compared with the distal lateral wall portions 734 and 736 of the optically conductive layer 712, due to exposure of the proximal lateral wall portions 738 and 740 to a wet etching process. However, thicknesses of the proximal lateral wall portions 738 and 740 in the directions of the arrow 728 may constitute as little as about 10% of the thickness of the optically conductive layer 712 in that same direction. Accordingly, losses of light from the optically conductive layer 712 caused by roughness of the proximal lateral wall portions 738 and 740 may be minimal.

Figure 8:
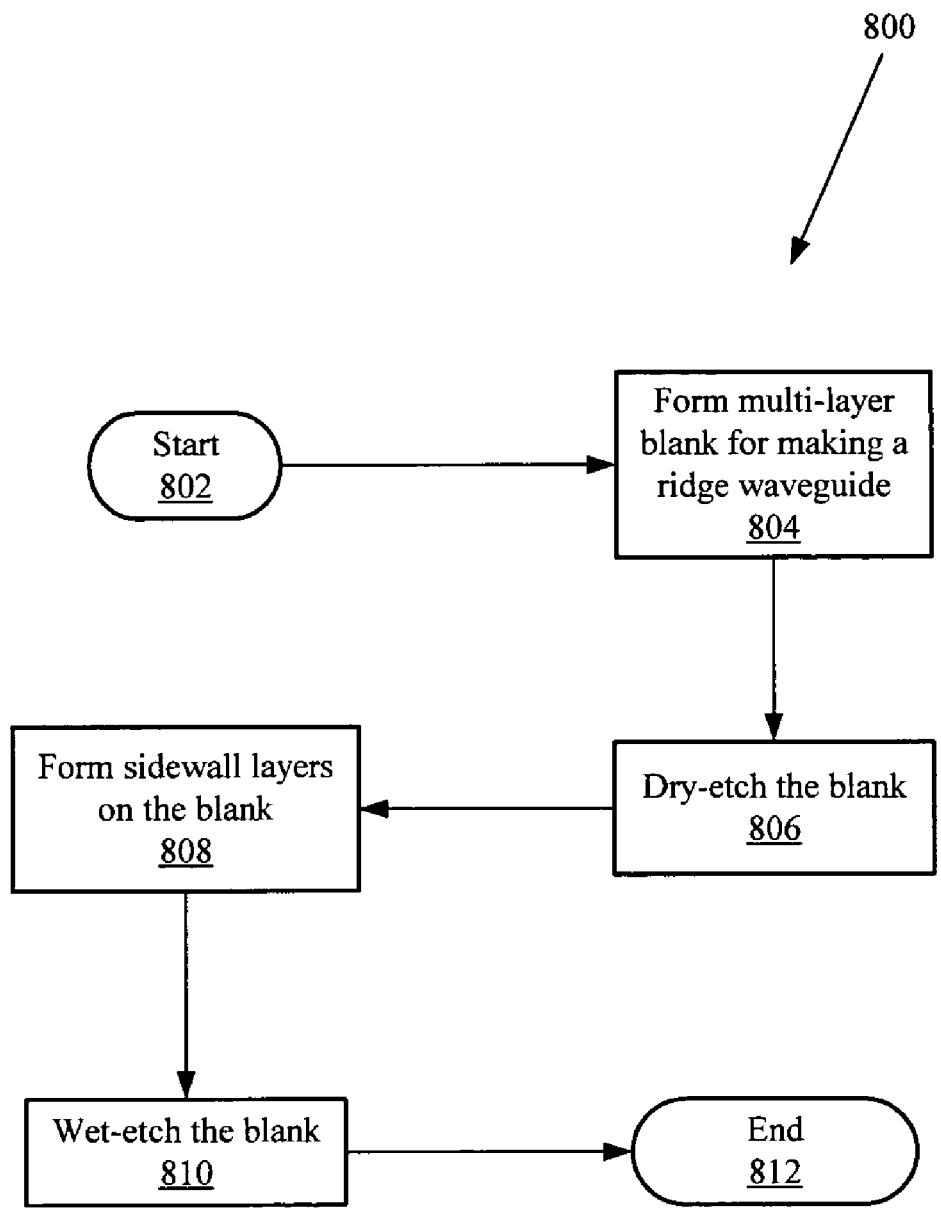
FIG. 8 is a flow chart showing a process for fabricating the ridge optical waveguide of FIG. 7.

FIG. 8 is a flow chart showing a process 800 for fabricating the ridge optical waveguide 700 of FIG. 7. FIG. 9 is a cross-sectional perspective side view showing a multi-layer blank 900 for forming the ridge optical waveguide 700 of FIG. 7. FIG. 10 is a cross-sectional perspective side view showing the ridge optical waveguide 700 of FIG. 7 in the form of a blank 1000 at a stage of partial fabrication. It is understood that the semiconductor compositions for the layers shown in FIGS. 9 and 10 are non-limiting examples and that other materials may be included or substituted as discussed in this specification. The process 800 starts at step 802, and at step 804 a multi-layer blank 900 shown in FIG. 9 may be formed for making the ridge optical waveguide 700. The multi-layer blank 900 may include, successively formed on the layer 720, the layers 718, 714, 710 and 708, having layer compositions as earlier discussed. The layer 720 may itself either be prefabricated or may be formed by a molding or coating or deposition process or the like. As an example, the layer 720 may be cut from a bulk crystal grown by the liquid-encapsulated Czochralski method or by the gradient freeze crystal growth method. The layers 718, 714, 710 and 708 may likewise be successively formed on the layer 720. In an example, a process such as metal-organic chemical vapor deposition ("MOCVD") or molecular beam epitaxy ("MBE") may be used to form the layers 718, 714, 710 and 708. A blank 902 for forming the optically conductive layer 712 may then be formed on the optically conductive layer 708, having a composition as earlier discussed regarding the optically conductive layer 712. A blank 904 for forming the optically conductive layer 716 may then be formed on the blank 902, having a composition as earlier discussed regarding the optically conductive layer 716. In an example, the layer 746 may be formed as part of a blank 906 having dimensions substantially equal to those of the blank 904 and having a composition as earlier discussed regarding the layer 746, and may then be shaped by etching to its final dimensions. As an example, such shaping may be carried out by reactive ion etching ("RIE") or deep reactive ion etching ("DRIE"). In another example (not shown), the layer 746 may be formed on the blank 904 having its selected final dimensions in the same manner as discussed above in connection with FIGS. 3-5, so that subsequent shaping of the layer 746 may be unnecessary. In an implementation, a photolithographic masking process may be utilized to control the dimensions of the layer 746 as formed to their selected final form. Formation of the layer 746 having its selected final dimensions may facilitate completion of dry etching step 806 of the process 800, as a composition may be selected for forming the layer 746 that may be resistant to a dry etching process. The layer 748 may be formed on the layer 746 or the blank 906, having layer compositions as earlier discussed. The layer 748 including an electrode may be formed, as an example, as disclosed in the Chen et al. U.S. Published Patent Application No. 2005/0068887. It is appreciated that the above-discussed order of operations within step 804 for forming the multi-layer blank 900 may be changed without departing from the process.

Figure 9:
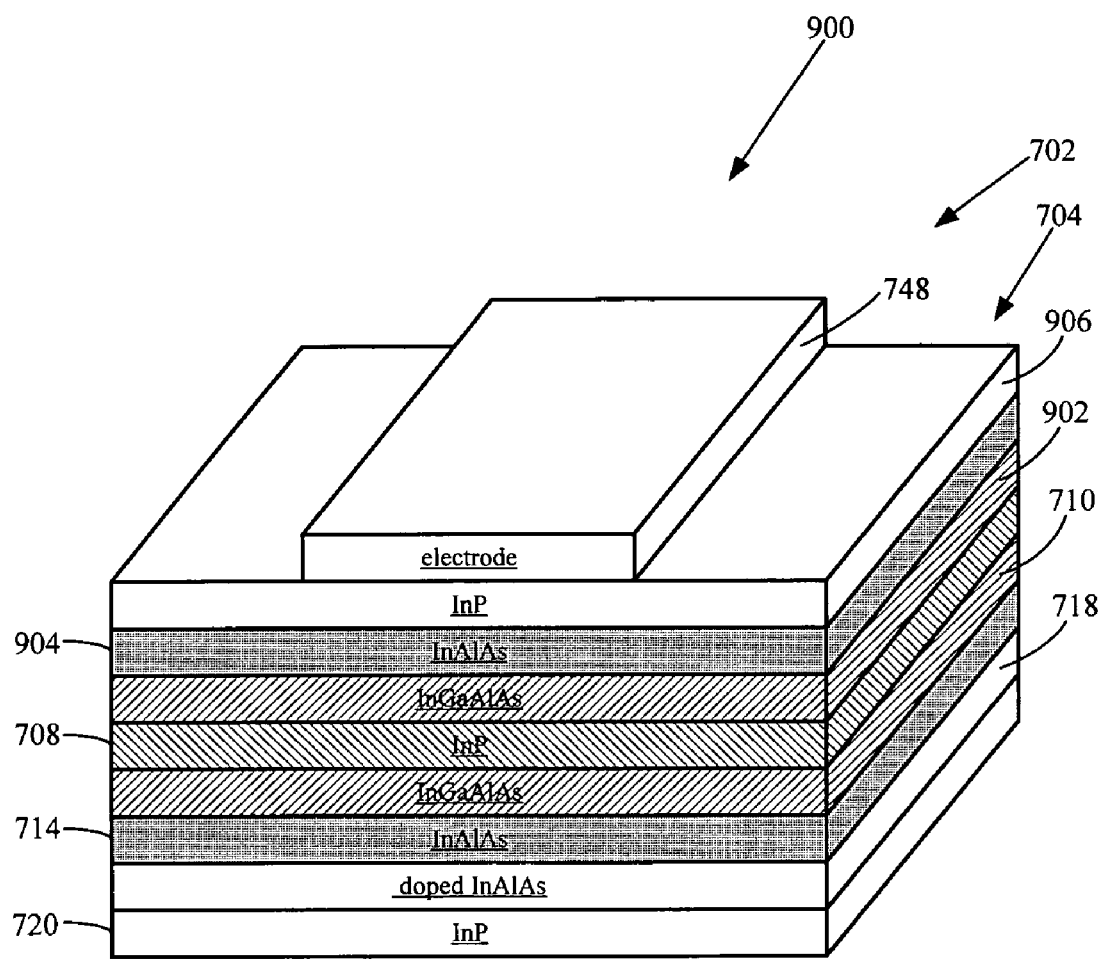
FIG. 9 is a cross-sectional perspective side view showing a multi-layer blank for forming the ridge optical waveguide of FIG. 7.
Figure 10:
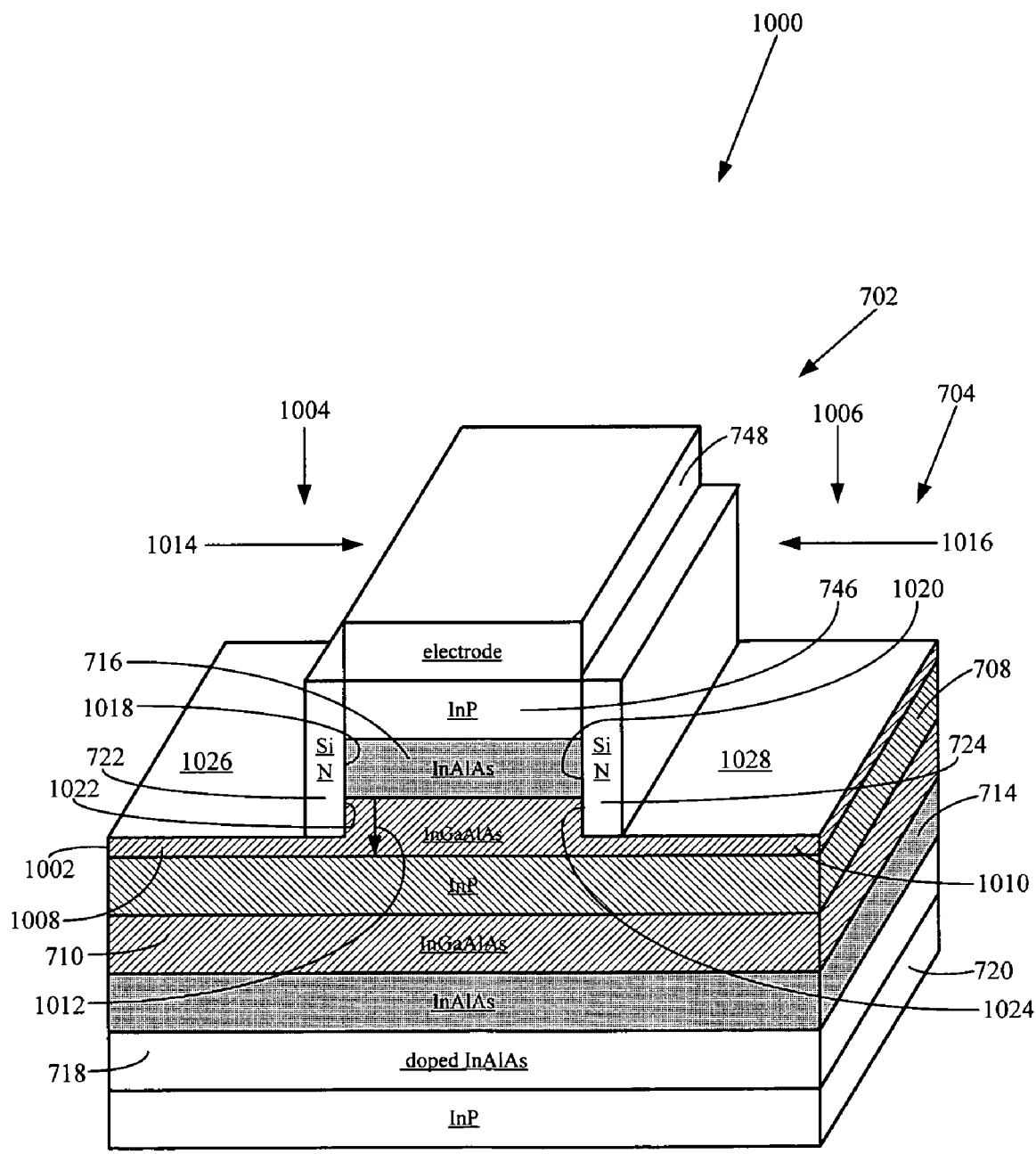
FIG. 10 is a cross-sectional perspective side view showing the ridge optical waveguide of FIG. 7 at a stage of partial fabrication.

In step 806, a dry etching process is used to form the optically conductive layer 716 from the blank 904, as part of the multi-layer blank 900 in its form as shown in FIG. 9. The dry etching process may then be continued to partially form the optically conductive layer 712, resulting in the blank 1002 for the optically conductive layer 712 shown in FIG. 10. The dry etching process may be, as an example, a RIE process, such as a DRIE process. The dry etching process may be carried out generally in the directions of the arrows 1004 and 1006 shown in FIG. 10. The layer 748 may prevent erosion of portions of the blank 1000 that lie below the layer 748 during execution of the dry etching or other dry processing. An endpoint for the dry etching process may be detected before complete removal of the blank 1002 has taken place in the regions 1008 and 1010 of the blank 1002, and the dry etching process may then be terminated. Such an endpoint for the dry etching process may be selected, as an example, because dry etching processes may be unsuitable for precisely ending anisotropic etching down to the optically conductive layer 708 to leave the substantially planar top surfaces 742 and 744 shown in FIG. 7. In an example, the dry etching process may be permitted to continue until up to about 90% of a thickness of the blank 902 in the direction of the arrow 1012 has been removed. Dry etching may, however, generally be anisotropically focused in the directions of the arrows 1004 and 1006, so that minimal etching may occur during the dry etching process in the lateral directions of the arrows 1014 and 1016. The anisotropic dry etching process may leave relatively smooth lateral walls 1018 and 1020 on the optically conductive layer 716, and may similarly leave relatively smooth distal lateral wall portions 1022 and 1024 on the resulting blank 1002 for the optically conductive layer 712.

The regions 1008 and 1010 of the blank 1002 may have relatively rough surfaces 1026 and 1028, due to direct impact of the dry etching process on these surfaces. These rough surfaces 1026 and 1028 may cause significant losses of propagating light if the blank 1000 is used as a optical waveguide in the form as shown in FIG. 10. In an example, the regions 1008 and 1010 of the blank 1002 may thus need to be removed in order to complete formation of the optically conductive layer 712. The regions 1008 and 1010 of the blank 1002 may also need to be removed in such a manner so that substantially planar surfaces 742 and 744 of the optically conductive layer 708 remain, thus reducing such losses of light. A wet etching process may be utilized to perform such a removal of the regions 1008 and 1010, using an etching composition that may erode the regions 1008 and 1010 but may erode the optically conductive layer 708 either much more slowly or substantially not at all. The inclusion of optically conductive layers 712 and 708 within a core region for the ridge optical waveguide 700 having substantially equal refractive indices but different semiconductor compositions facilitates this selective wet etching process in the directions of the arrows 1004 and 1006. However, a wet etching process may isotropically erode the blank 1002, so that the lateral walls 1018 and 1020 on the optically conductive layer 716 and the distal lateral wall portions 1022 and 1024 on the blank 1002 may need to be protected from wet etching.

In step 808, sidewall layers 722 and 724 are formed on the blank 1000. In an example, blanks (not shown) for forming the sidewall layers 722 and 724 may be deposited onto the blank 1000 adjacent to the lateral walls 1018 and 1020 and the distal lateral wall portions 1022 and 1024, and then shaped by a dry etching process to the dimensions as shown in FIG. 10. As examples, the blanks may be deposited onto the blank 1000 by MOCVD or MBE, and then dry etched by an RIE or DRIE process.

In step 810, a wet etching process is utilized to complete formation of the ridge optical waveguide 700. A wet etchant composition may be deposited on the rough surfaces 1026 and 1028, and allowed to erode the regions 1008 and 1010 of the blank 1002 to yield substantially planar surfaces 742 and 744. The sidewall layers 722 and 724, together with the layer 746, may protect the lateral walls 1018 and 1020 of the optically conductive layer 716 and the distal lateral wall portions 1022 and 1024 of the blank 1002 from erosion by the wet etchant or other wet processing during fabrication of the ridge optical waveguide 700. Although some erosion of the blank 1002 may occur along the proximal lateral wall portions 738 and 740 of the resulting optically conductive layer 712, this erosion may be minimal as most of the thickness of the blank 1002 in the direction of the arrow 1012 may be protected by the sidewall layers 722 and 724. The process 800 then ends at step 812.

The peak optical waveguides 100 and 200 may be utilized broadly in any end-use application for a ridge or mesa optical waveguide. As examples, the peak optical waveguides 100 and 200 may be utilized to form an integral part of a passive or active optical circuit, switch, cross-connect, splitter, or other optical waveguide component of an optical circuit. The ridge optical waveguide 700 may be likewise utilized, and in addition may facilitate the fabrication of a portion of a circuit for actively controlling, modulating or otherwise affecting light propagating in the optical waveguide, such as a phase modulator.

Although the invention has been described with reference to a particular example of an embodiment, it will be apparent to those skilled in the art that various changes and modifications can be made without departing from the scope of the invention. Such changes and modification are intended to be covered by the appended claims.

What is claimed is:

1. An apparatus, comprising:
   an optical core region and an optical cladding region;
   an optical core layer being a part of the optical core region, the optical core layer having a top surface;
   an optically conductive peak including another part of the optical core region, the optically conductive peak being located and elongated on, and spanning a first height on the optical core layer;
   the optically conductive peak having first and second lateral walls each including distal and proximal lateral wall portions, the proximal lateral wall portions of the optically conductive peak intersecting the top surface of the optical core layer; and
   first and second sidewall layers located on the lateral walls, the sidewall layers not intersecting the top surface of the optical core layer, and spanning a second height that is less than the first height measured in the same direction.

2. The apparatus of claim 1, wherein the optically conductive peak is configured to optically guide light propagating along the top surface of the optical core layer.

3. The apparatus of claim 1, wherein the optically conductive peak is configured to optically guide light propagating through the optically conductive peak.

4. The apparatus of claim 1, wherein the distal lateral wall portions have surfaces that are smoother than are surfaces of the proximal lateral wall portions.

5. The apparatus of claim 1, wherein refractive indices of the proximal lateral wall portions and of the optical core layer are substantially equal.

6. The apparatus of claim 1, wherein a first semiconductor composition of the optical core layer is different from a second semiconductor composition of the proximal lateral wall portions.

7. The apparatus of claim 6, wherein the first semiconductor composition is substantially less susceptible to dissolution by an etchant than is the second semiconductor composition, the etchant including, by volume, about 1 part hydrogen peroxide, about 1 part phosphoric acid, and about 30 parts water.

8. The apparatus of claim 7, wherein a semiconductor composition of the first and second sidewall layers is substantially less susceptible to dissolution by the etchant than is the second semiconductor composition.

9. The apparatus of claim 6, wherein each of the first and second semiconductor compositions includes at least one element of Group III and at least one element of Group V of the periodic table.

10. The apparatus of claim 9, wherein each of the first and second semiconductor compositions includes a member selected from a group consisting of: indium-phosphide, indium-aluminum-arsenide, indium-gallium-aluminum-arsenide, indium-gallium-arsenide, gallium arsenide, gallium nitride, aluminum nitride, indium nitride, gallium antimonide, indium antimonide, aluminum antimonide, aluminum gallium nitride, aluminum gallium arsenide, aluminum gallium antimonide, gallium aluminum antimonide, indium gallium antimonide, gallium arsenic antimonide, indium gallium phosphide, indium arsenic antimonide, indium gallium arsenide phosphide, indium aluminum gallium nitride, indium aluminum gallium antimonide, and mixtures including two or more of the foregoing.

11. The apparatus of claim 1, wherein the top surface is substantially planar.

12. An apparatus, comprising:

a substrate having a top surface;

an optically conductive mesa located and elongated on, and spanning a first height on, the top surface of the substrate;

the optically conductive mesa including a first optical cladding layer on the top surface of the substrate, an optical core layer on the first optical cladding layer, and a second optical cladding layer on the optical core layer;

the optically conductive mesa having first and second lateral walls each including distal and proximal lateral wall portions, the proximal lateral wall portions of the optically conductive mesa intersecting the top surface of the substrate; and first and second sidewall layers located on the lateral walls, the sidewall layers not intersecting the top surface of the substrate, and spanning a second height that is less than the first height measured in the same direction.

13. The apparatus of claim 12, wherein the top surface is substantially planar.

14. The apparatus of claim 12, wherein the distal lateral wall portions have surfaces that are smoother than are surfaces of the proximal lateral wall portions.

15. The apparatus of claim 12, wherein a first semiconductor composition of the substrate is different from a second semiconductor composition of the proximal lateral wall portions.

16. The apparatus of claim 15, wherein the first semiconductor composition is substantially less susceptible to dissolution by an etchant than is the second semiconductor composition, the etchant including, by volume, about 1 part hydrogen peroxide, about 1 part phosphoric acid, and about 30 parts water.

17. The apparatus of claim 16, wherein a semiconductor composition of the first and second sidewall layers is substantially less susceptible to dissolution by the etchant than is the second semiconductor composition.

18. The apparatus of claim 15, wherein each of the first and second semiconductor compositions includes at least one element of Group III and at least one element of Group V of the periodic table.

19. The apparatus of claim 18, wherein each of the first and second semiconductor compositions includes a member selected from a group consisting of: indium-phosphide, indium-aluminum-arsenide, indium-gallium-aluminum-arsenide, indium-gallium-arsenide, gallium arsenide, gallium nitride, aluminum nitride, indium nitride, gallium antimonide, indium antimonide, aluminum antimonide, aluminum gallium nitride, aluminum gallium arsenide, aluminum gallium antimonide, gallium aluminum antimonide, indium gallium antimonide, gallium arsenic antimonide, indium gallium phosphide, indium arsenic antimonide, indium gallium arsenide phosphide, indium aluminum gallium nitride, indium aluminum gallium antimonide, and mixtures including two or more of the foregoing.

* * * * *